US012102589B2

(12) United States Patent
Mongiello, Jr.

(10) Patent No.: US 12,102,589 B2
(45) Date of Patent: *Oct. 1, 2024

(54) GUIDING SYSTEM

(71) Applicant: Michael Joseph Mongiello, Jr., South Salem, NY (US)

(72) Inventor: Michael Joseph Mongiello, Jr., South Salem, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/128,981

(22) Filed: Mar. 30, 2023

(65) Prior Publication Data

US 2023/0248604 A1 Aug. 10, 2023

Related U.S. Application Data

(63) Continuation of application No. 17/331,780, filed on May 27, 2021, now Pat. No. 11,628,119.

(51) Int. Cl.
*A61H 3/04* (2006.01)

(52) U.S. Cl.
CPC ....... *A61H 3/04* (2013.01); *A61H 2201/0173* (2013.01); *A61H 2201/1642* (2013.01)

(58) Field of Classification Search
CPC .......................... A61H 3/04; A61H 2201/0173
See application file for complete search history.

(56) References Cited

U.S. PATENT DOCUMENTS

| | | | | | |
|---|---|---|---|---|---|
| 2,621,707 | A * | 12/1952 | Ames | A61H 3/04 482/67 |
| 5,513,789 | A * | 5/1996 | Woods | A61H 3/02 224/407 |
| D823,173 | S * | 7/2018 | Eikenberry | D12/130 |
| 10,111,506 | B1 * | 10/2018 | Brenner | A45B 3/00 |
| 10,192,469 | B1 * | 1/2019 | Brenner | G09F 7/08 |
| 10,609,993 | B2 * | 4/2020 | Brenner | A45B 3/04 |
| 2003/0010546 | A1 * | 1/2003 | Roberts | A61H 3/04 180/65.1 |
| 2004/0216339 | A1 * | 11/2004 | Garberg | G09F 23/06 40/308 |
| 2007/0278271 | A1 * | 12/2007 | Koren | A45C 3/00 224/407 |
| 2013/0256357 | A1 * | 10/2013 | Prosperie | A45C 11/00 224/572 |

* cited by examiner

*Primary Examiner* — Noah Chandler Hawk
(74) *Attorney, Agent, or Firm* — The Law Firm of AQ Basit

(57) ABSTRACT

An apparatus including a walker and a guider attached to the walker. The guider has three sides. The first side of the three sides attaches to a front of the walker. The second side of the three sides attaches to a first side of the walker. The third side of the three sides attaches to a second side of the walker.

18 Claims, 16 Drawing Sheets

GUIDING SYSTEM

BACKGROUND

Various types of walkers exist that attempt to assist individuals with physical challenges and disabilities to move around. These walkers are generally designed to allow an individual to hold onto the walker which provides support for the individual while the individual attempts to move from one location to another location. Currently, there are no walkers that provide for a controlled boundary to limit an individual's legs, while using the walker, from extending beyond the perimeter of the walker. No existing walkers are effective at assisting the guidance of the individual's feet, who is using the walker, from overstepping, tripping, losing their center of balance, and prevents the individual from falling. Thus, existing walkers are not effective at assisting an individual with physical challenges to move around comfortably, efficiently, and safely.

DETAILED DESCRIPTION OF PREFERRED EMBODIMENTS

The following detailed description refers to the accompanying drawings. The same reference numbers in different drawings may identify the same or similar elements.

Systems, devices, and/or methods describe herein a guiding walker that allows an individual to move effectively between different locations. A guiding walker may be designed with features which prevent the individual's feet from moving in a direction that is different than the direction of the guiding walker. Since the feet of the individual (who is using the guiding walker) are both moving in the same direction as the guiding walker (i.e., the individual's feet are being guided by the guiding walker), the individual can move more effectively since (1) the individual's body weight stays centered in comparison to the guiding walker, (2) the individual is less prone to trip or hurt themselves as the feet now have boundaries and travel within the physical limits of the guiding walker, (3) the individual has more control over their steps and, accordingly, becomes more confident in their walking ability and (4) the individual can spend less time moving from one location to another location.

Furthermore, the guiding walker may have features that are adjustable so that the guiding walker can be used on walkers of different heights and widths. In addition, one or more features (e.g., a guider) of the guiding walker may be removable, such that a non-guiding walker may be converted into a guiding walker and vice versa.

Accordingly, the guiding walker ensures that the individual using the guiding walker gains stability, control, and confidence while using less energy and effort than if the individual were to use a non-guiding walker with no guiding mechanism. Such a guiding walker resolves those situations where a non-guiding walker does not help an individual who has weakness and/or limited control in their feet and/or legs to move effectively from one location to another location. Thus, by using a guided walker, the individual spends less time correcting overstepping, less time attempting to regain their balance and, as a result, increases the individual's confidence and endurance while moving between different locations.

Figure 1A:
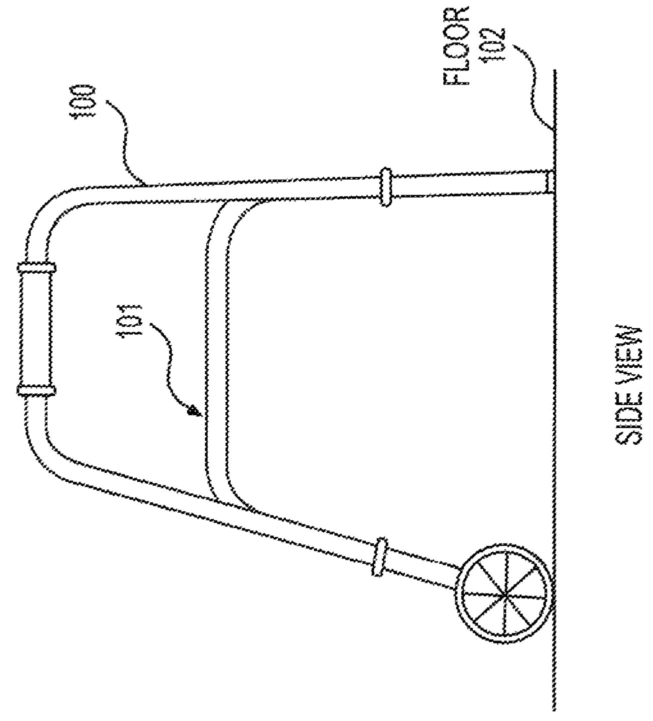
FIG. 1A PRIOR ART
FIGS. 1A and 1B are example schematic diagrams of a non-guiding walker.
Figure 1B:
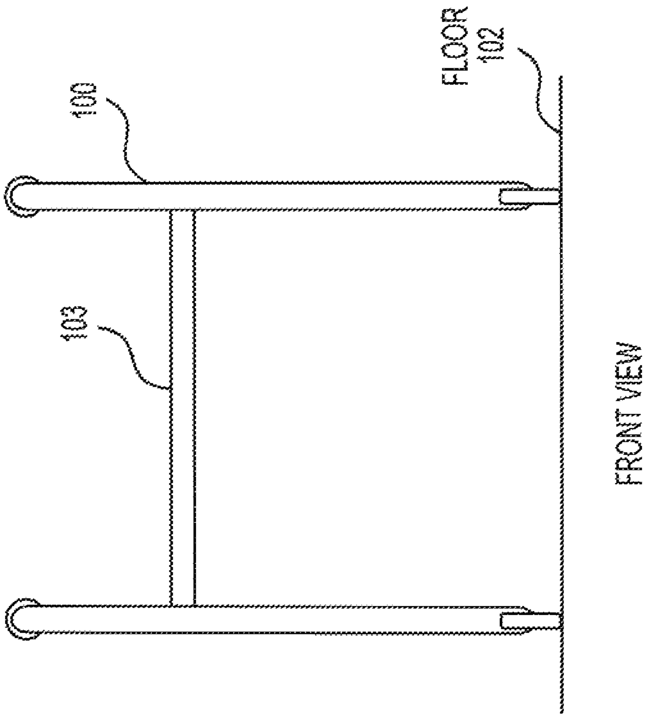
FIG. 1B PRIOR ART

FIGS. 1A and 1B describe example diagrams of existing non-guiding walkers. As shown in FIG. 1A, a side of view of non-guiding walker 100 is shown. FIG. 1B shows a front view of non-guiding walker 100. As shown in FIG. 1A, there is an empty space between bar 101 and floor 102; and, as shown in FIG. 1B, there is an empty space between bar 103 and the floor 102. Because of this empty space, the legs and/or feet of an individual suing non-guiding walker 100 can overstep forward and/or sideways causing instability, loss of balance, and/or tripping.

Figure 2:
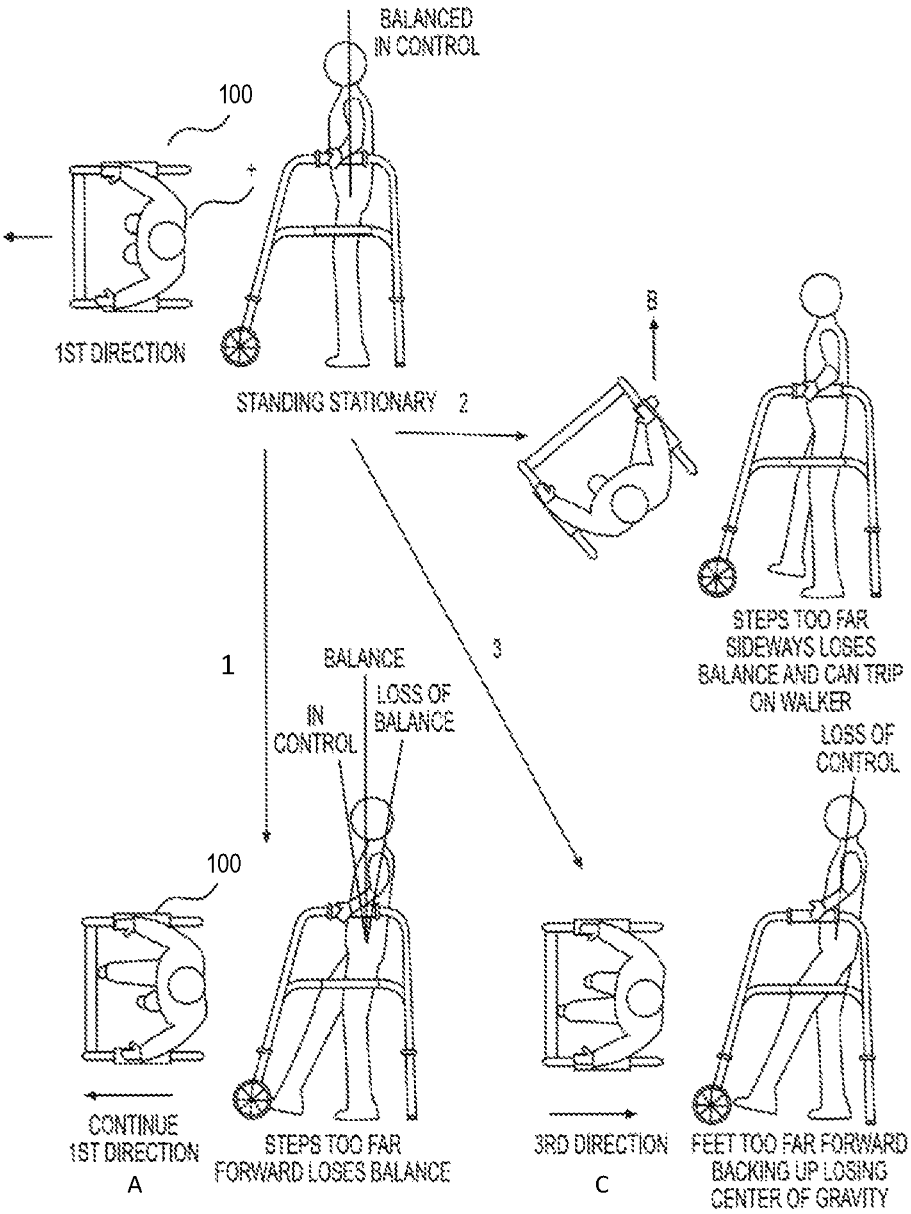
FIG. 2 PRIOR ART
FIG. 2 is an example schematic diagram of a non-guiding walker in use.

As shown in FIG. 2, an above perspective view is shown of an individual, X, using non-guiding walker 100. In this non-limiting example, the individual has had brain damage from a recent stroke and requires a walker to assist them in moving between different locations. As shown in FIG. 2, the individual pushes non-guiding walker 100 in a particular direction, direction 1; however, the individual's feet move too far in direction A, and also outside the perimeter of non-guiding walker 100, which is not the same as the direction of non-guiding walker 100. Thus, this results in imbalance and a risk of falling. Furthermore, the individual is being forced to use additional physical energy since the individual is pushing non-guiding walker 100 in one direction but the individual's feet are moving in another direction. Alternatively, the individual pushes non-guiding walker 100 in another direction, direction 2; however, the individual's feet move in a direction B which is not the same direction of non-guiding walker 100. In another non-limiting example, the individual decides to push non-guiding walker 100 in another direction, direction 3; however, the individual's feet are not only in direction C but are also outside the perimeter of non-guiding walker 100. In this non-limiting example, the individual is not moving effectively and runs a large risk of tripping and/or falling. Thus, a non-guiding walker does not provide effective mobility assistance to individual X.

Figures 3A, 3B:
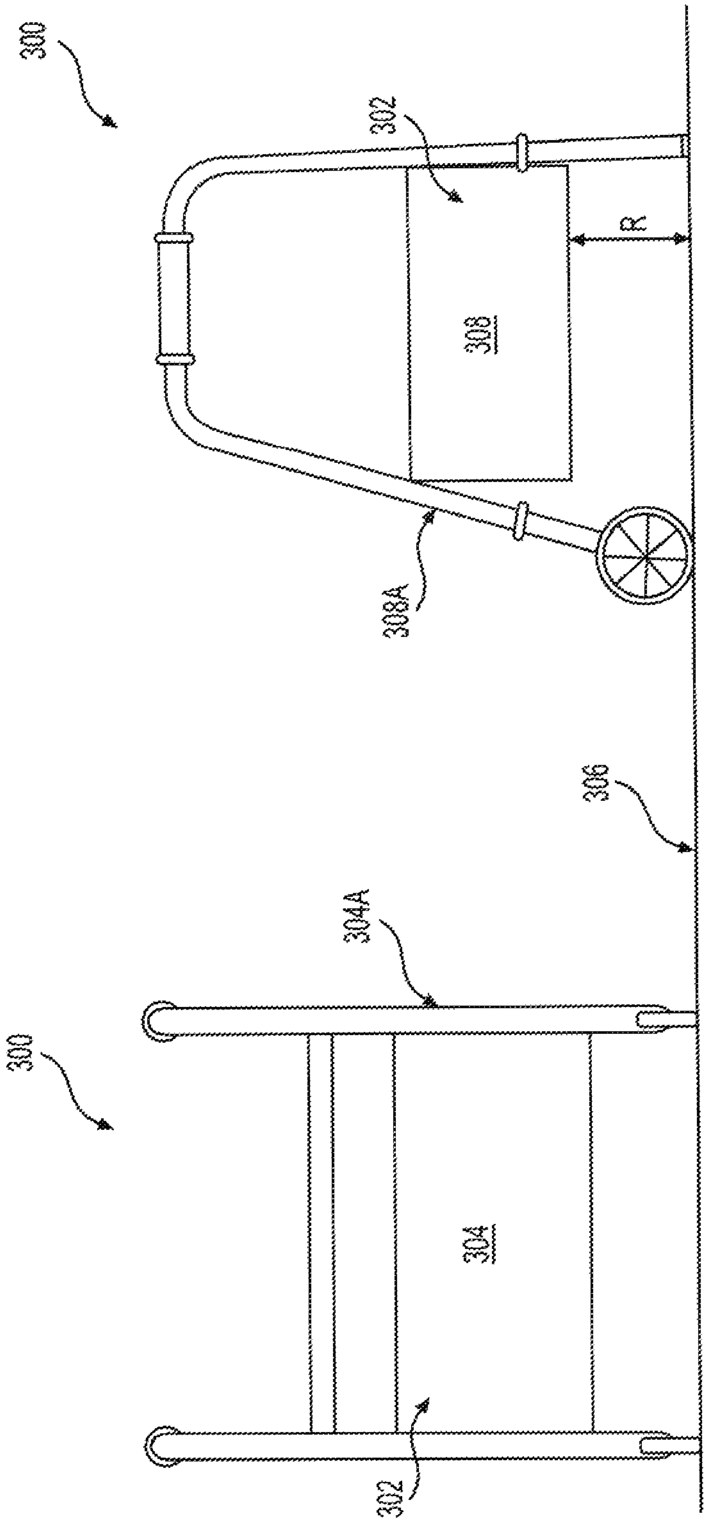
FIGS. 3A and 3B are example diagrams of a guiding walker.

FIGS. 3A and 3B show example diagrams of a guiding walker. As shown in FIG. 3A, guiding walker 300 is shown from a front and side view. As shown in FIG. 3A, guiding walker 300 has a guider 302 which has a front plate 304 (shown in FIG. 3) that extends from a position below bar 306 to a position just above floor 306 so that front plate 304 does not touch floor 306. As shown in FIG. 3B, guiding walker 300's side view shows side 308 which is attached at edge 308A to edge 304A of front plate 304 (as shown in the front view).

In embodiments, guider 302 may allow for the feet of an individual using guiding walker 300 to move in the same direction as guiding walker 300. In embodiments, guider 302 may be permanently attached to guiding walker 300 or guider 302 may be detachable from guiding walker 300.

Figure 4:
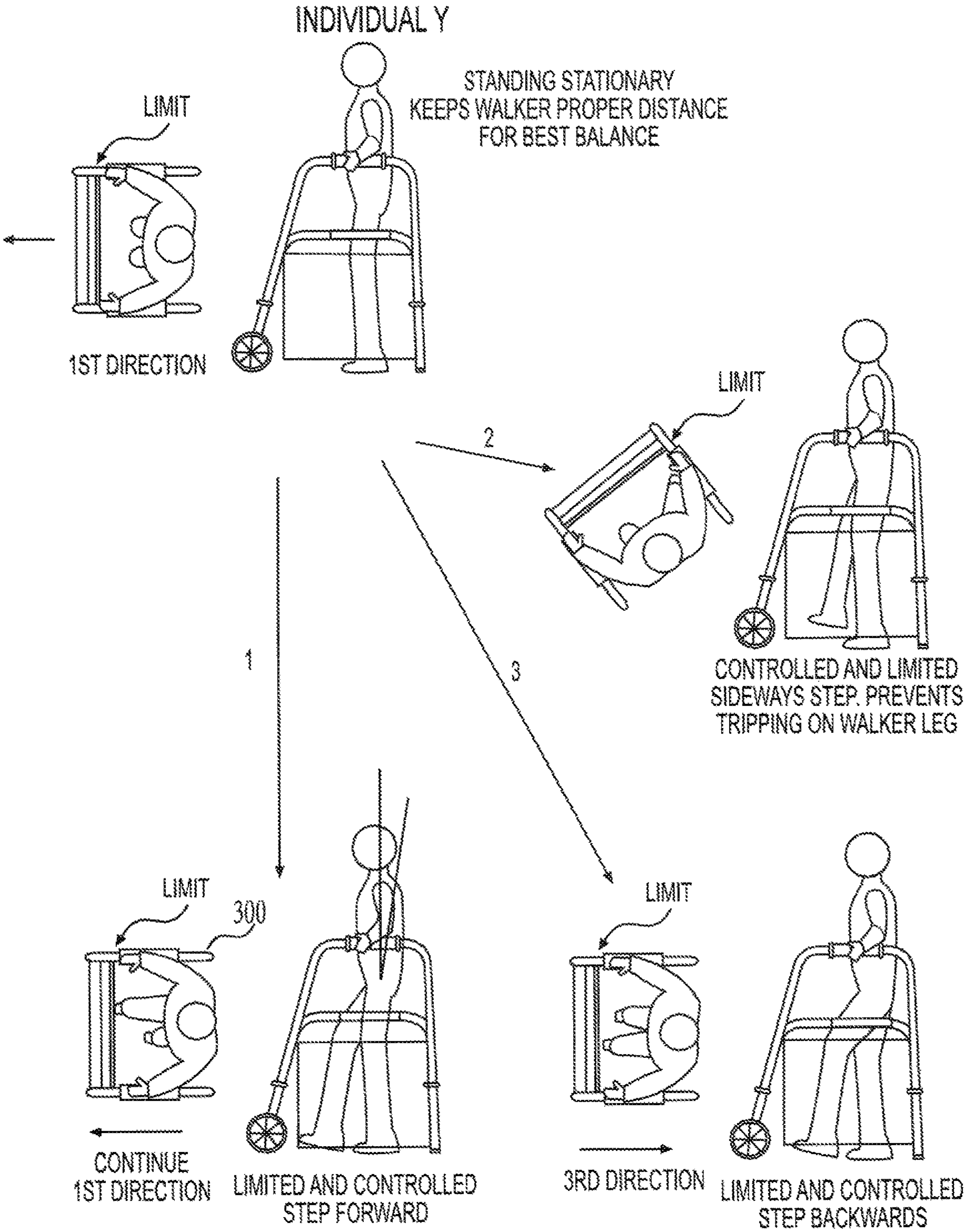
FIG. 4 is an example schematic diagram of a guiding walker in use.

FIG. 4 shows an example schematic diagram describing use of guiding walker 300. As shown in FIG. 4, from a top and side perspective view, an individual, Y, has grabbed onto guiding walker 300. Once the individual starts to walk in a particular push guiding walker 300 in a particular direction, the individual's feet also move in the direction using guiding walker 300, the individual's legs/feet stay within the perimeters of guided walker 300. This is because the individual's feet are pushing against a front plate 304 (which is part of guider 302) while still maintaining a centered and balanced posture. In addition, guider 302 also has side plates 308 which keeps the individual's feet within the side perimeters while the individual is using guiding walker 300.

As shown in FIG. 4, guiding walker 300 is moved in direction 1 and the individual's feet are limited in how far they step forward forcing the individual take shorter, controlled steps which keep the individual balanced. Thus, the individual is using less energy and gains confidence as the individual moves with guided walker 300 from one location to another. As shown in FIG. 4, guiding walker 300 is moved in a different direction 2 and the individual's feet are again limited in how far they step forward and are able to take shorter, controlled steps and maintaining the individual's balance (e.g., individual's center of balance) during movement in that direction. Again, the individual is using less energy and gains confidence as the individual moves with guided walker 300 from one location to another. As shown in FIG. 4, guiding walker 300 is moved in direction 3 where the individual is moving backwards. Again, guiding walker 300 ensures that the individual can take limited and controlled steps as they move in reverse.

Figure 5:
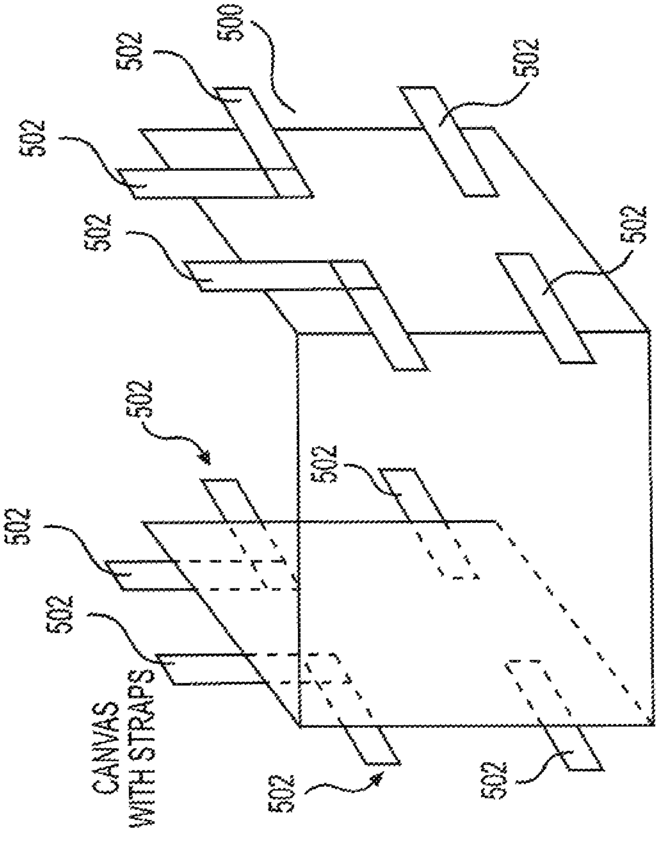
FIG. 5 is an example diagram of a guider.

FIG. 5 shows an example guider 500. In embodiments, guider 500, when fixed to a walker, guides an individual's feet in a manner similar to guider 302 as described in FIGS. 3 and 4. In embodiments, guider 500 may be detachable from a walker, such as guiding walker 300. As shown in FIG. 5, guider 500 has three sides with each side having a rectangular or square shape. In embodiments, guider 500 may be constructed of canvas, polyester, tarp, or any other material that can remain relatively rigid when attached to a walker, such as guiding walker 300. In embodiments, as shown in FIG. 5, guider 500 may have multiple straps 502 that can be used to attach to any type of walker so that the walker can become a guiding walker, such as guiding walker 300. In embodiments, multiple straps 502 may attach to different portions of a walker. For example, one or more of multiple straps 502 may attach to one or both of the walker's side bars while others of the one or more multiple straps 502 may attach to a one or both of the walker's legs. Alternatively, one or more of multiple straps 502 may attach to one or both of the walker's handles.

Figure 6:
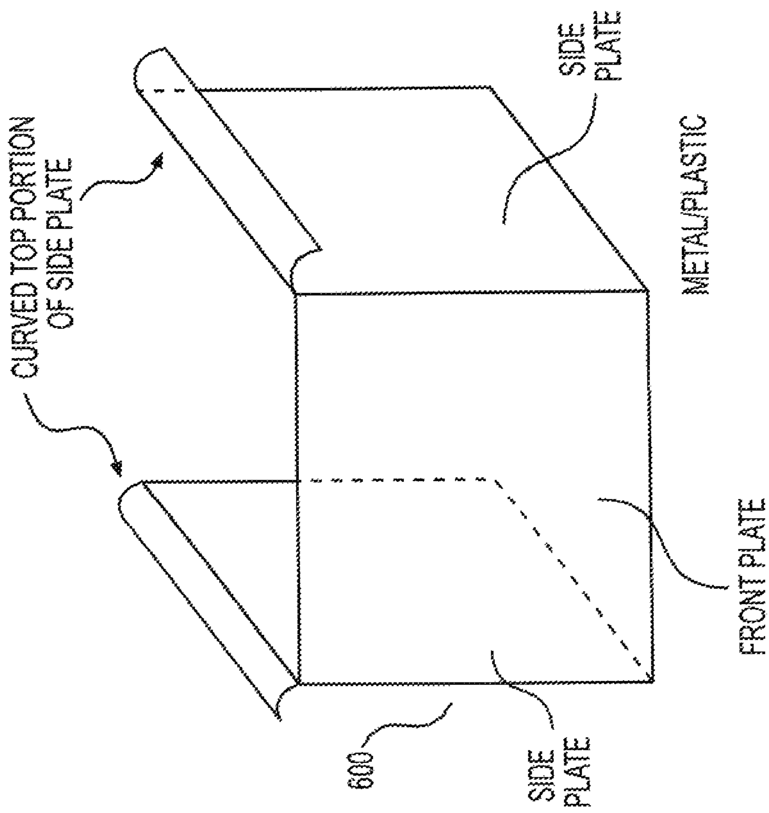
FIG. 6 is an example diagram of a guider.

FIG. 6 shows an example guider 600. In embodiments, guider 600, when fixed to a walker, guides an individual's feet in a manner similar to guider 302 as described in FIGS. 3 and 4. In embodiments, guider 600 may be detachable from a walker, such as guiding walker 300. As shown in FIG. 6, guider 600 has three sides with each side being either rectangular or square shaped. In embodiments, guider 600 may have curved top edges that allows for guider 600 to attach to each of a walker's side bars. In embodiments, a front plate (or side) of guider 600 may be attached to the two side plates (or other sides) by using hinges. Alternatively, a front plate of guider 600 may be attached to the two side plates by welding each of the components to manufacture guider 600 as shown in FIG. 6. In embodiments, guider 600 may be constructed of a metal material, such as aluminum, steel, titanium, or any other type of metal.

In alternate embodiments, guider 600 may be constructed of a plastic-type material. In embodiments, guider 600 may be constructed of a combination of different materials. For example, each side plate may be constructed of a first material while the top portion, which is used to attach guider 600 to a walker, may be constructed of a second material. For example, the first material may be metal while the second material may be a plastic material which has been attached to the first material (e.g., with a glue-like substrate such as a type of adhesive). In another example, the first material may be one type of metal and the second material may be a second type of metal which has been attached to the first material (e.g., welded, using rivets, screws, etc.).

Figure 7:
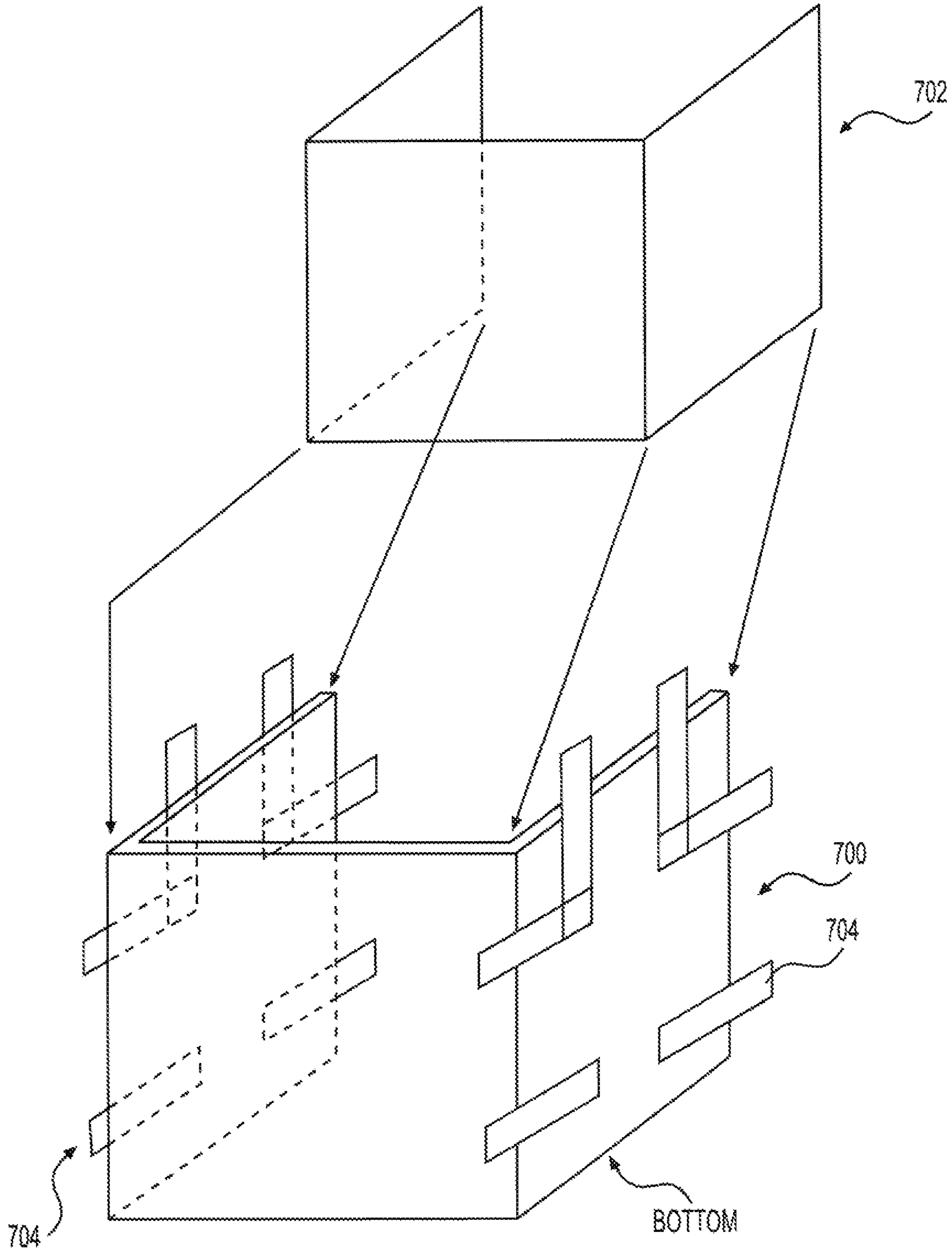
FIG. 7 is an example diagram of a guider.

FIG. 7 shows an example guider 700. In embodiments, guider 700, when fixed to a walker, guides an individual's feet in a manner similar to guider 302 as described in FIGS. 3 and 4. In embodiments, guider 700 may be detachable from a walker, such as guiding walker 300. As shown in FIG. 7, guider 700 has three sides with each side being either rectangular or square shaped. In embodiments, guider 700, when attached to a walker, may be attached so that the bottom portion of guider 700 does not touch the ground. In embodiments, guider 700 may be attached to a walker so that the bottom portion of guider 700 is 0.5 inches from the ground. In embodiments, guider 700 may be constructed of a canvas material that allows for a similarly shaped (e.g., three-sided apparatus), secondary guider 702, to fit inside guider 700. In embodiments, guider 700 may act as a sleeve that can receive secondary 702 and making guider 700 into a more rigid structure. In embodiments, guider 700 may have its lower sections of its sleeve seemed together (e.g., stitched, glued, etc.) so as to hold secondary guider 702 and prevent secondary guider 702 from falling out. In embodiments, multiple straps 704 may attach to different portions of a walker. For example, one or more of multiple straps 704 may attach to one or both of the walker's side bars while others of the one or more multiple straps 704 may attach to a one or both of the walker's legs. Alternatively, one or more of multiple straps 704 may attach to one or both of the walker's handles.

Figure 8:
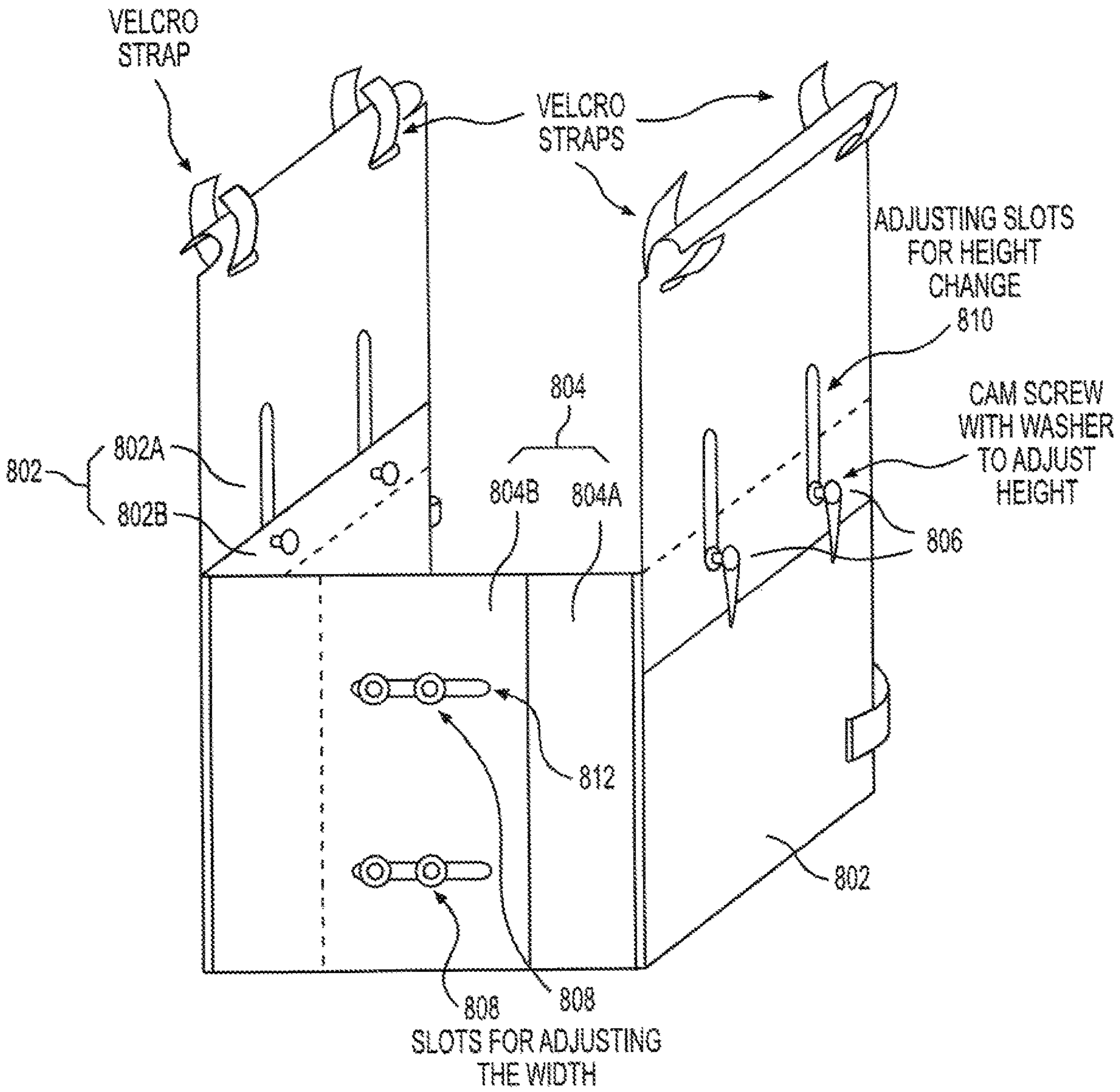
FIG. 8 is an example diagram of a guider.

FIG. 8 shows example guider 800. In embodiments, guider 800, when fixed to a walker, guides an individual's feet in a manner similar to guider 302 as described in FIGS. 3 and 4. In embodiments, guider 800 has three sides with each side being either rectangular or square shaped. In embodiments, each of the sides of guider 800 may be adjustable with a mechanism. As shown in FIG. 8, guider 800 has sides 802 and front 804. In embodiments, the height of sides 802 may be adjustable with a mechanism 806. In embodiments, the width of front 804 may be adjustable with a mechanism 808. In embodiments, any adjustments to the height of sides 802 may be independent of any adjustments to the width of front 804. For example, if the height of sides 802 is adjusted, the width of front 804 may still be kept the same width. In another example, if the width of front 804 is adjusted, the heights of sides 802 may be kept the same height. In embodiments, one side of 802 may be adjusted to a different height than another side of 802.

In alternate embodiments, each of sides 802 may be adjustable but front 804 is not adjustable. In other embodiments, front 804 may be adjustable but each of sides 802 are not adjustable. Accordingly, in other embodiments, mechanisms 806 and/or 808 may not be provided on sides 802 and/or front 804.

In embodiments, each of sides 802 may be constructed of two layers which allow for an adjustment of the height of each of sides 802. In embodiments, each of sides 802 may have layer 802A and 802B. In embodiments, layer 802A may be connected to front 804 and is not adjustable in its height. In embodiments, layer 802B is connected to layer 802A in a manner that allows for an adjustable height of layer 802B and, as such, the overall height of each of sides 802. As shown in FIG. 8, sides 802 has apertures 810 (e.g., slots) which each have mechanism 806 that attach 802A and 802B together. Thus, for each of sides 802, mechanism 806 moves up and down apertures 810 to adjust the overall height for each of sides 802.

In embodiments, front 804 may be constructed of two layers which allow for an adjustment of the width of front 804. In embodiments, front 804 may have layer 804A and 804B. In embodiments, layer 804A may be connected to one of sides 802 while layer 804B may be connected to the other one of sides 802. In embodiments, layer 804A may be connected to one of sides 802 via a hinge, welding, glue, fasteners, or any other process depending on the material of layer 804A and sides 802. In embodiments, layer 804B may be connected to one of sides 802 via a hinge, welding, glue, fasteners, or any other process depending on the material of layer 804B and sides 802. In embodiments, layer 804A and layer 804B are connected to each other in a manner that allows for an adjustable overall width of front 804. In embodiments, one of layer 804A or layer 804B may be of a fixed width while the other of layer 804A or layer 804B can be moved so that the overall width of front 804 changes. As shown in FIG. 8, front 804 has apertures 812 (e.g., slots) which each have mechanism 808 that attach 804A and 804B together. Thus, for front 804, mechanism 808 moves up and down apertures 812 to adjust the overall width for each of sides 802.

In embodiments, guider 800 may be permanently attached to a walker or may be removable from a walker.

Figure 9A:
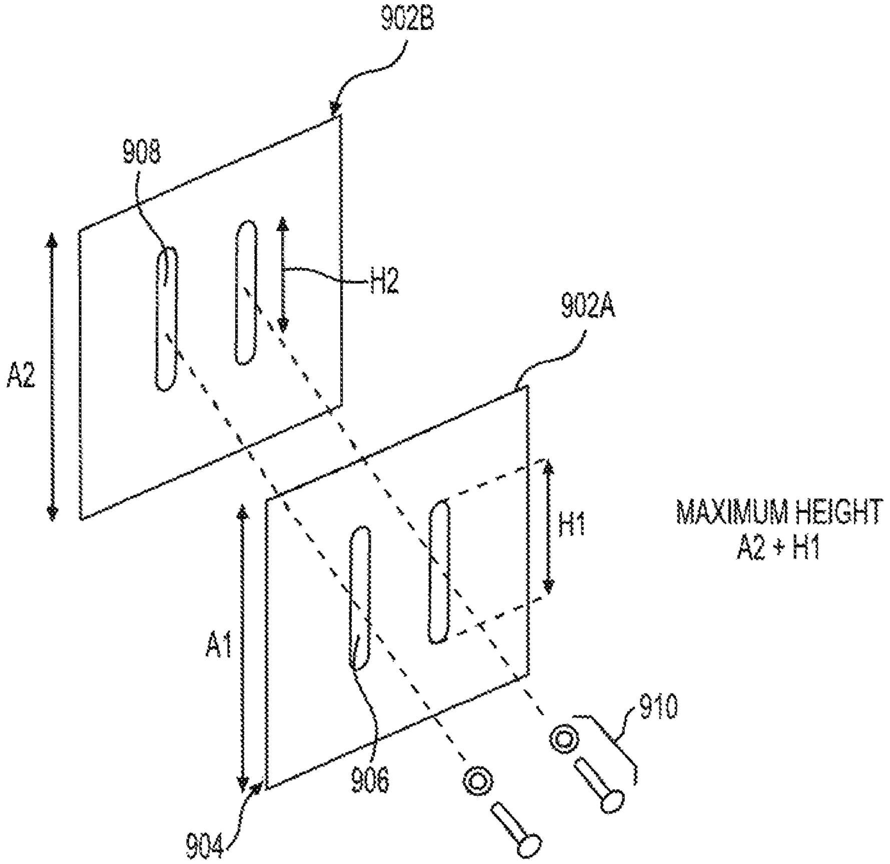
FIGS. 9A and 9B are example diagrams of sections of a guider.
Figure 9B:
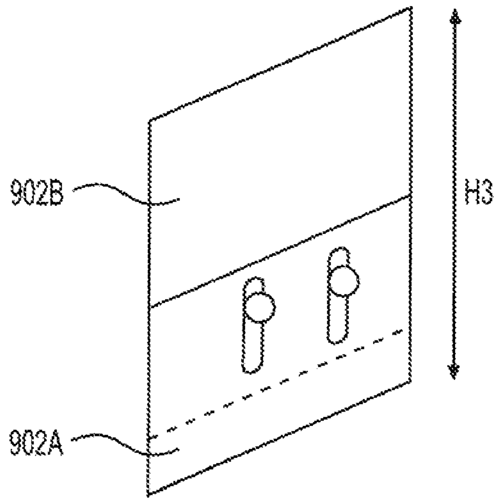

FIG. 9A shows an example side 902. In embodiments, side 902 may be similar to each of sides 802 described in FIG. 8. As shown in FIG. 9A, side 900 has two layers, 902A and 902B. In embodiments, edge 904 of 902A may be connected to a front of a guider, such as guider 800. In embodiments, 902A has an aperture 906, such as a slot, that has a particular height, H1, as shown in FIG. 9A. Also shown in FIG. 9A, layer 902B has an aperture 908, such as a slot, that has a particular height, H2. In embodiments, H1 and H2 may be of the same height or may be of different heights. In embodiments, layer 902B may only connect to layer 902A via a mechanism 910 that fits through the apertures on both layers 902A and 902B. As shown in FIG. 9A, layer 902A has height A1 and layer 902B has height A2. While FIGS. 9A and 9B show two slots on each layer, one aperture 906 (slot) may be provided on each layer. Alternatively, more than two apertures 906 may also be provided.

As shown in FIG. 9A, mechanism 910 may be used as a connector through apertures 906 and 908. In embodiments, mechanism 910 may be a type of screw along with zero or more washers.

FIG. 9B shows layers 902A and 902B connected to each other such that side 902 is of a particular height, H3. In embodiments, mechanism 910 may be used to adjust the position of layer 902B with 902A and result in layer 902B having a height that is less than or greater than height H3. In embodiments, the minimum height measurement of side 902 is the height of layer 902A.

Figure 10A:
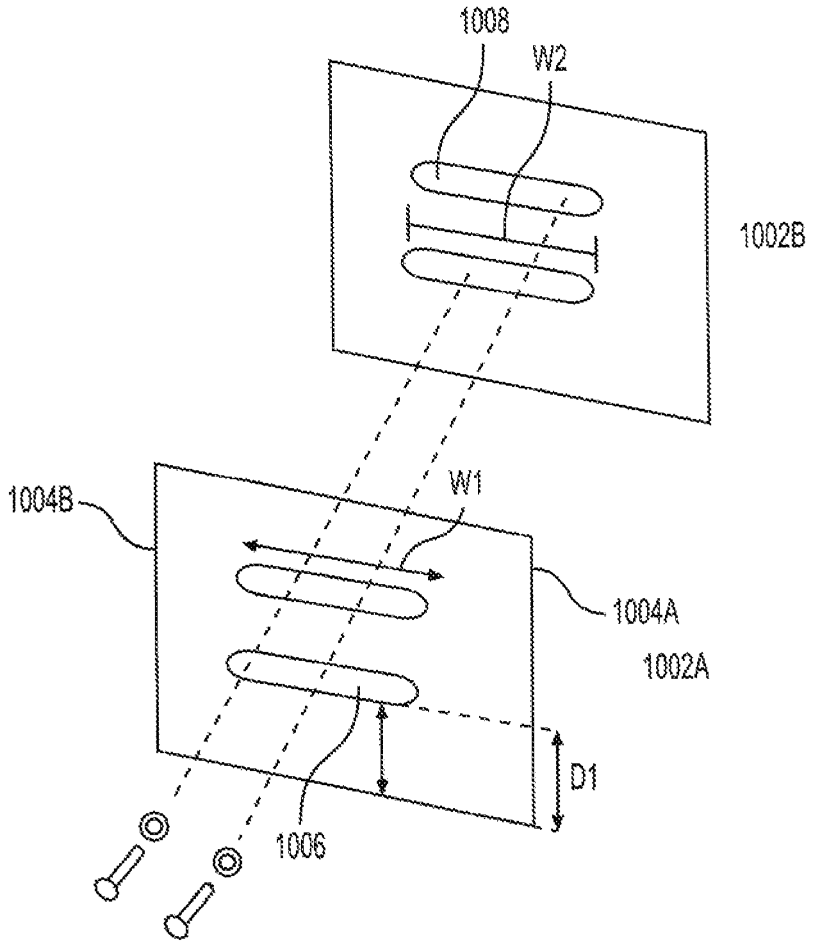
FIGS. 10A and 10B are example diagrams of sections of a guider.

FIG. 10A shows an example front 1002. In embodiments, front 1002 may be similar to front 804 described in FIG. 8. As shown in FIG. 10A, front 1000 has two layers, 1002A and 1002B. In embodiments, edge 1004A of 1002A may be connected to one side (e.g., one of side 902) of a guider, such as guider 800. In embodiments, edge 1004B of 1002B may be connected to another side (e.g., one of sides 902) of a guider, such as guider 800.

In embodiments, 1002A has apertures 1006, such as a slot, that each have a particular width, W1, as shown in FIG. 10A. Also shown in FIG. 10A, layer 1002B has apertures 1008, such as a slot, that each have a particular width, W2. In embodiments, W1 and W2 may be of the same width or may be of different widths. In embodiments, layer 1002B may only connect to layer 1002A via a mechanism 1010 that fits through the apertures on both layers 1002A and 1002B. While FIG. 10A shows two apertures on each layer, one aperture on each layer may be sufficient to connect the two layers.

Figure 10B:
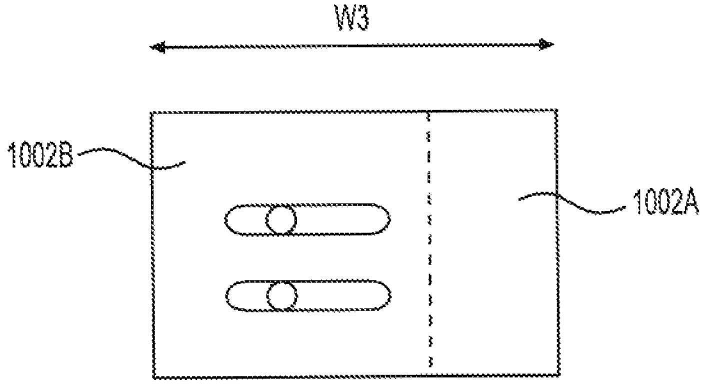

FIG. 10B shows layers 1002A and 1002B connected to each other such that the overall width of front 1002 is of particular width, W3. In embodiments, mechanism 910 may be used to adjust the position of layer 1002B with 1002A and result in front 1002 having an overall width that is less than or greater than W3. In embodiments, the minimum width measurement of front 1002 is the width of layer 1002A or 1002B which are both of the same width. In embodiments, the maximum width measurement of front 1002 is a width that is not greater than the width between the two front legs of a walker.

Figure 11A:
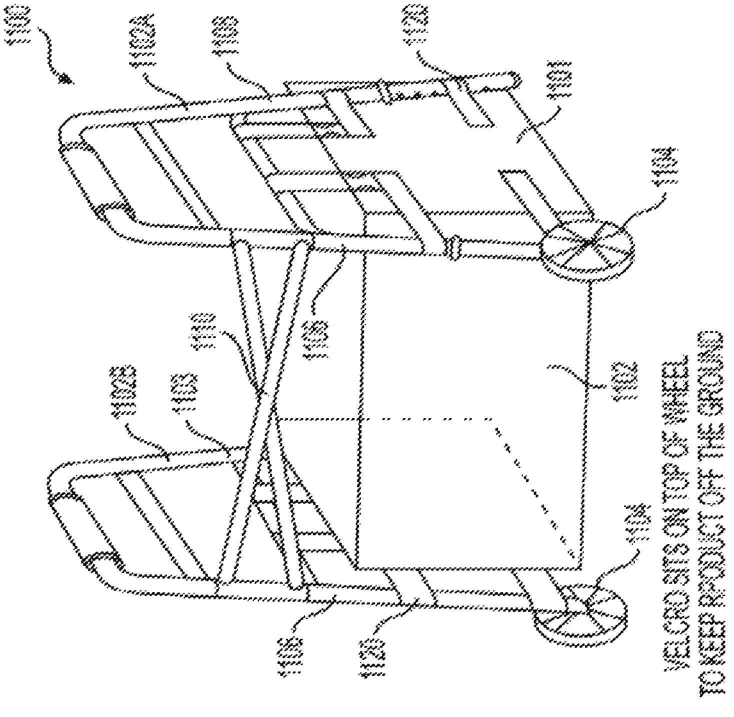
FIGS. 11A and 11B are example diagrams of a guiding walker.

FIG. 11A shows an example perspective view of walker 1100 with a guider 1101 acting as a guiding system. As shown in FIG. 11A, walker 1100 has legs 1102A and 1102B. As shown in FIG. 11A, both legs 1102A and 1102B have a wheel 1104 located at the front section 1106 of each long while a back section 1108 of both legs 1102A and 1102B has no wheel. As shown in FIG. 11A, connector 1110 connects to legs 1102A and 1102B. In embodiments, connector 1110 can be one rod (of any shape) or can be an apparatus that has more than one rod (of any shape or design) that connects to legs 1102A and 1102B.

As shown in FIG. 11A, guider 1101 is connected to walker 1100 by using multiple straps 1120. In embodiments, guider 1101 may be similar to guider 500 as described in FIG. 5 or guider 700 as described in FIG. 7. In embodiments, FIG. 11A, guider 1101 may be detachable from walker 1100.

Figure 11B:
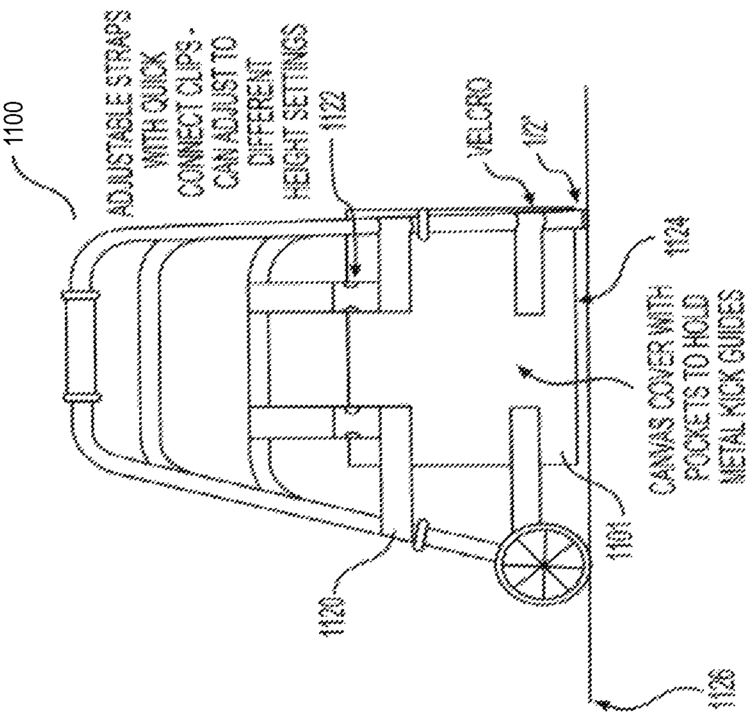

FIG. 11B shows an example side view of walker 1101 with guider 1102. As shown in FIG. 11B, the side view of guider 1101 is shown attached to walker 1100. As shown in FIG. 11B, guider 1101 is attached by using straps 1120 and also adjustable strap 1122 which allow for the height of the sides of guider 1101 to be adjusted based on the overall height of walker 1101. As shown in FIG. 11B, the bottom edge 1124 of guider 1101 is about 0.5 inches above floor 1126.

Figure 12A:
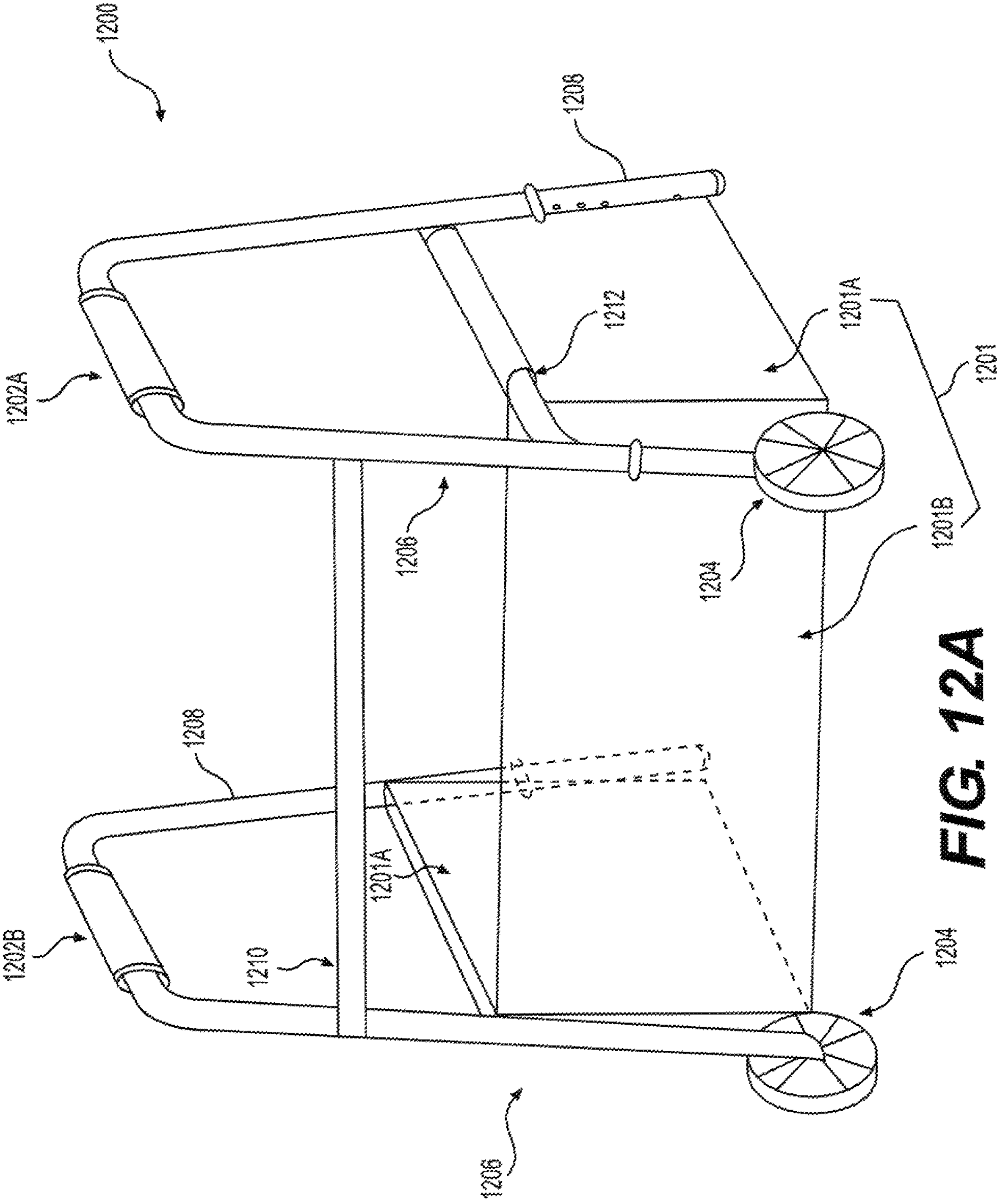
FIGS. 12A and 12B are example diagrams of a guiding walker.

FIG. 12A shows an example perspective view of guiding system that includes walker 1200 and guider 1201. As shown in FIG. 12, walker 1200 has legs 1202A and 1202B. As shown in FIG. 12, both legs 1202A and 1202B have a wheel 1204 located at the front section 1206 of each leg while the back section 1208 of both legs 1202A and 1202B has no wheel. In alternate embodiments, walker 1200 may have four wheels. As shown in FIG. 12A, connector 1210 connects to legs 1202A and 1202B. In embodiments, connector 1210 can be one rod (of any shape) or can be an apparatus that has more than one rod (of any shape or design) that connects to legs 1202A and 1202B.

Figure 12B:
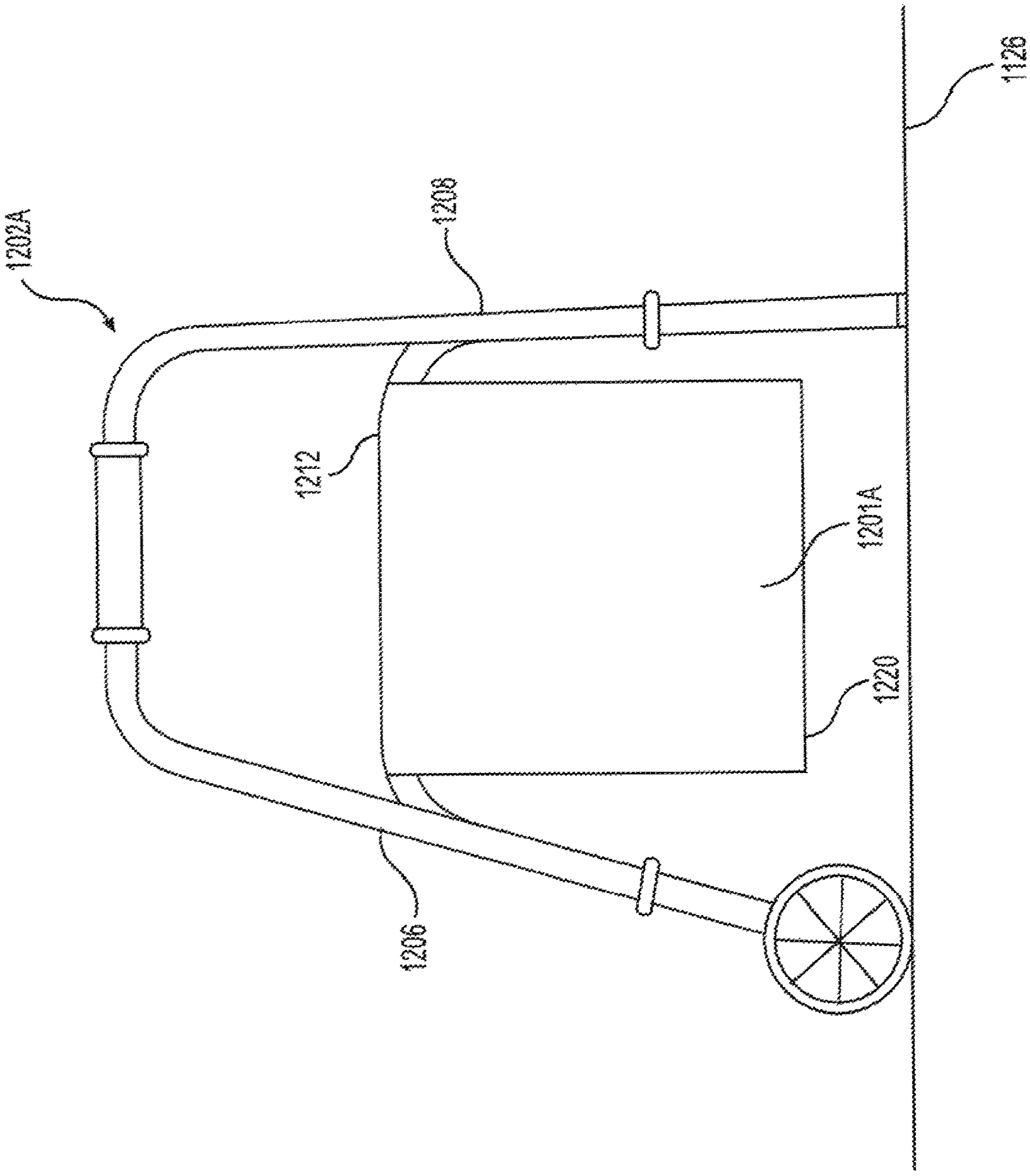

As shown in FIG. 12A, guider 1201 is connected to walker 1200. In embodiments, guider 1201 may be similar to guider 600 as described in FIG. 6. In embodiments, FIG. 12A, guider 1201 may be detachable from walker 1200. As shown in FIG. 12A, guider 1201 may have curved upper edges 1204 that allow for guider 202 to be fitted onto the bar 1212 of each of the legs (1202A and 1202B). FIG. 12B shows an example side perspective of walker 1200 and guider 1201 (shown in FIG. 12A). As shown in FIG. 12B, leg 1202A of walker 1200 is shown and side 1202A of guider 1201 is shown and is connected to bar 1212. As shown in FIG. 12B, the bottom edge 1220 of guider 1201 is about 0.5 inches above floor 1126.

Figure 13A:
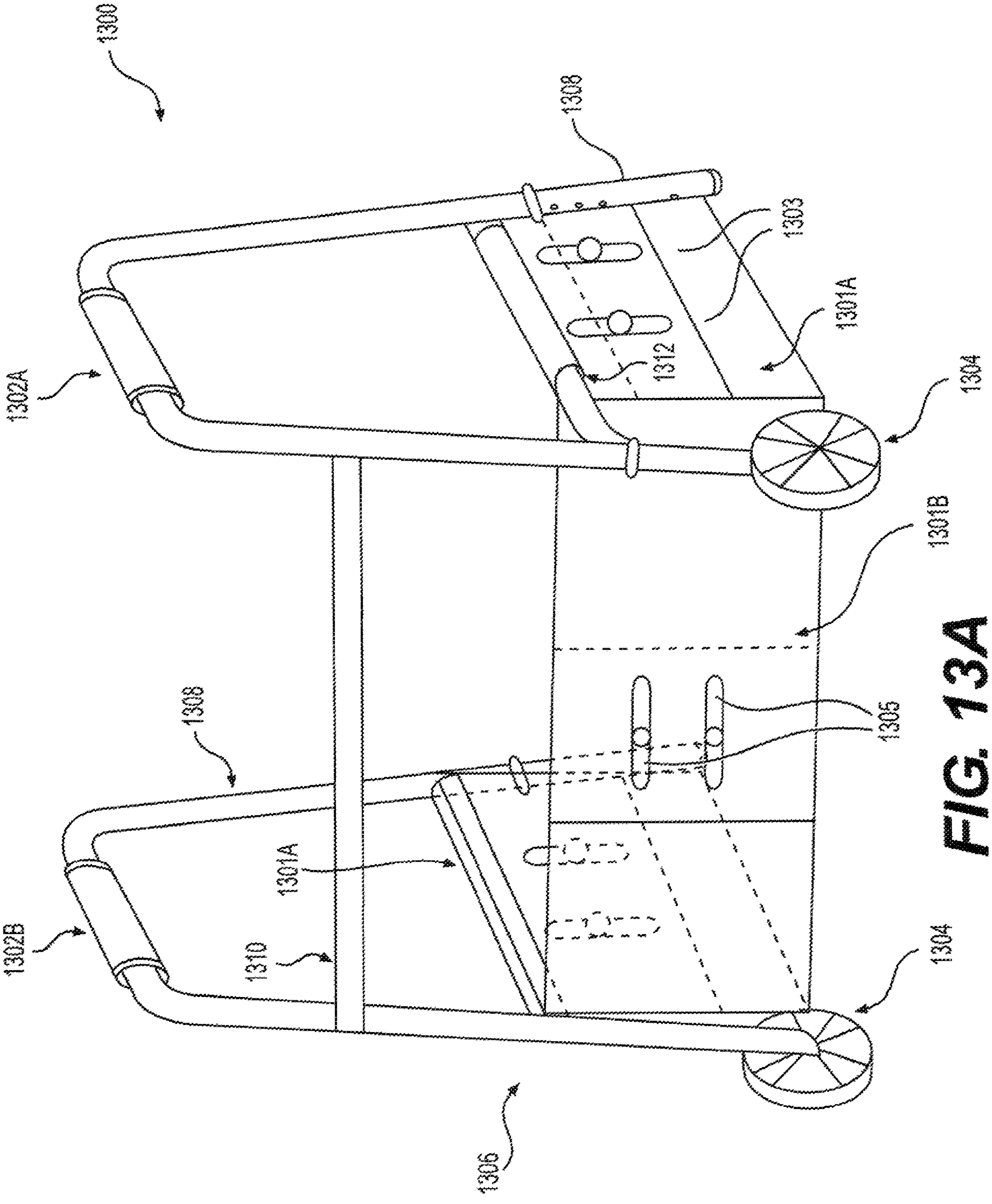
FIGS. 13A and 13B are example diagrams of a guiding walker.

FIG. 13A shows an example perspective view of walker 1300 with a guider 1301 acting as a guiding system. As shown in FIG. 13A, walker 1300 has legs 1302A and 1302B. As shown in FIG. 13A, both legs 1302A and 1302B have a wheel 1304 located at the front section 1306 of each long while the back section 1308 of both legs 1302A and 1302B has no wheel. As shown in FIG. 13A, connector 1308 connects to legs 1302A and 1302B. In embodiments, connector 1310 can be one rod (of any shape) or can be an apparatus that has more than one rod (of any shape or design) that connects to legs 1302A and 1302B. Also shown in FIG. 13A, side 1301A has apertures 1303 which includes connectors that layer 1 and layer 2 which make up each side 1301A (as there are two sides of guider 1301). In embodiments, apertures 1303 allow for adjustments for layers 1 and 2 so that guider 1301 can be used on different walkers.

Figure 13B:
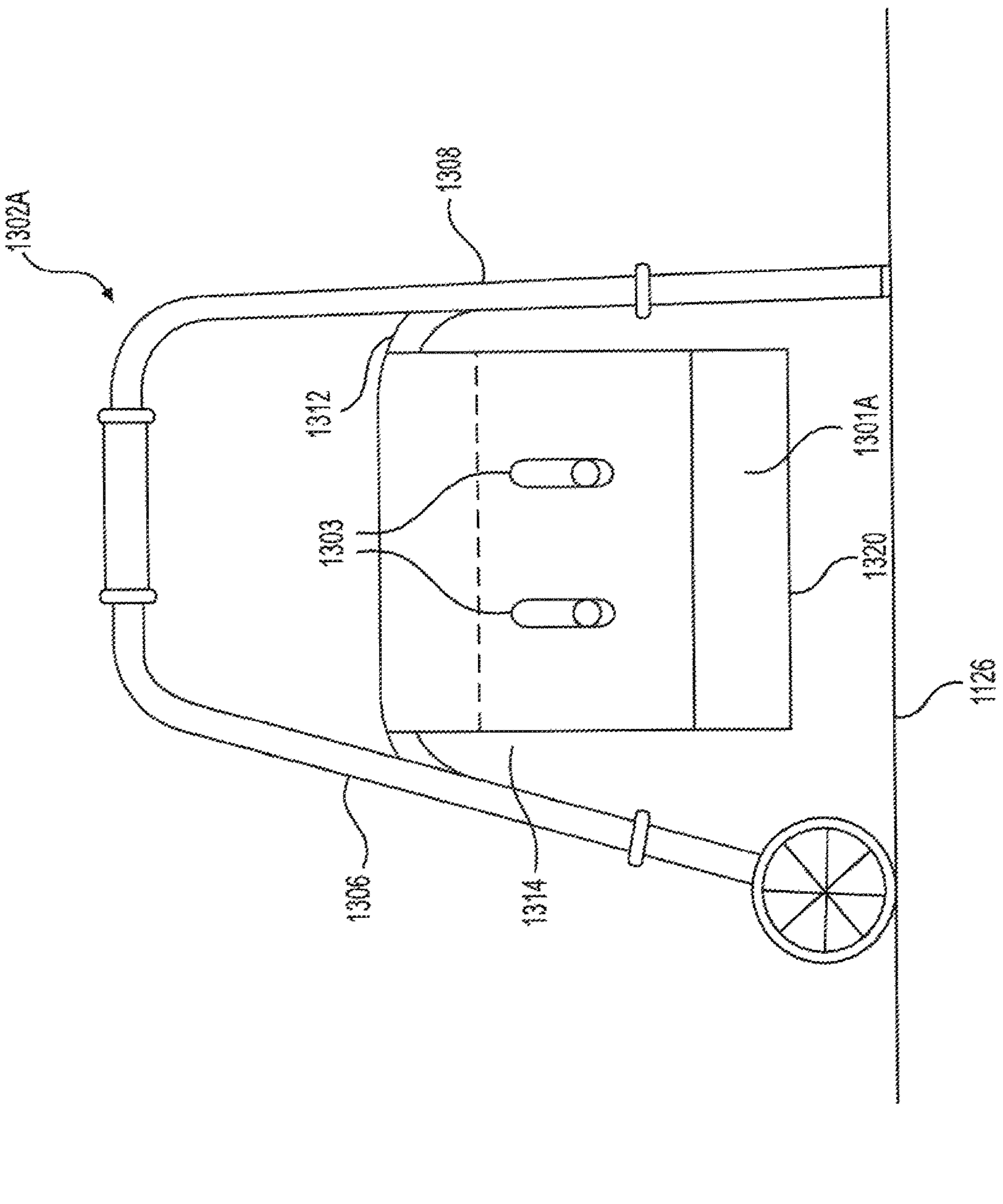

In embodiments, guider 1301 may be similar to guider 800 as described in FIG. 8. FIG. 13B shows a side perspective view of walker 1300 with guider 1301. As shown in FIG. 13B, guider 1301 has apertures 1303 which also show connectors that are connecting the two layers that make up side 1301A. As shown in FIG. 13B, side 1301A is connected to bar 1312. While not visible, side 1301A is connected at edge 1314 to the front of guider 1301. As shown in FIG. 12B, the bottom edge 1320 of guider 1301 is about 0.5 inches above floor 1126.

Figure 14:
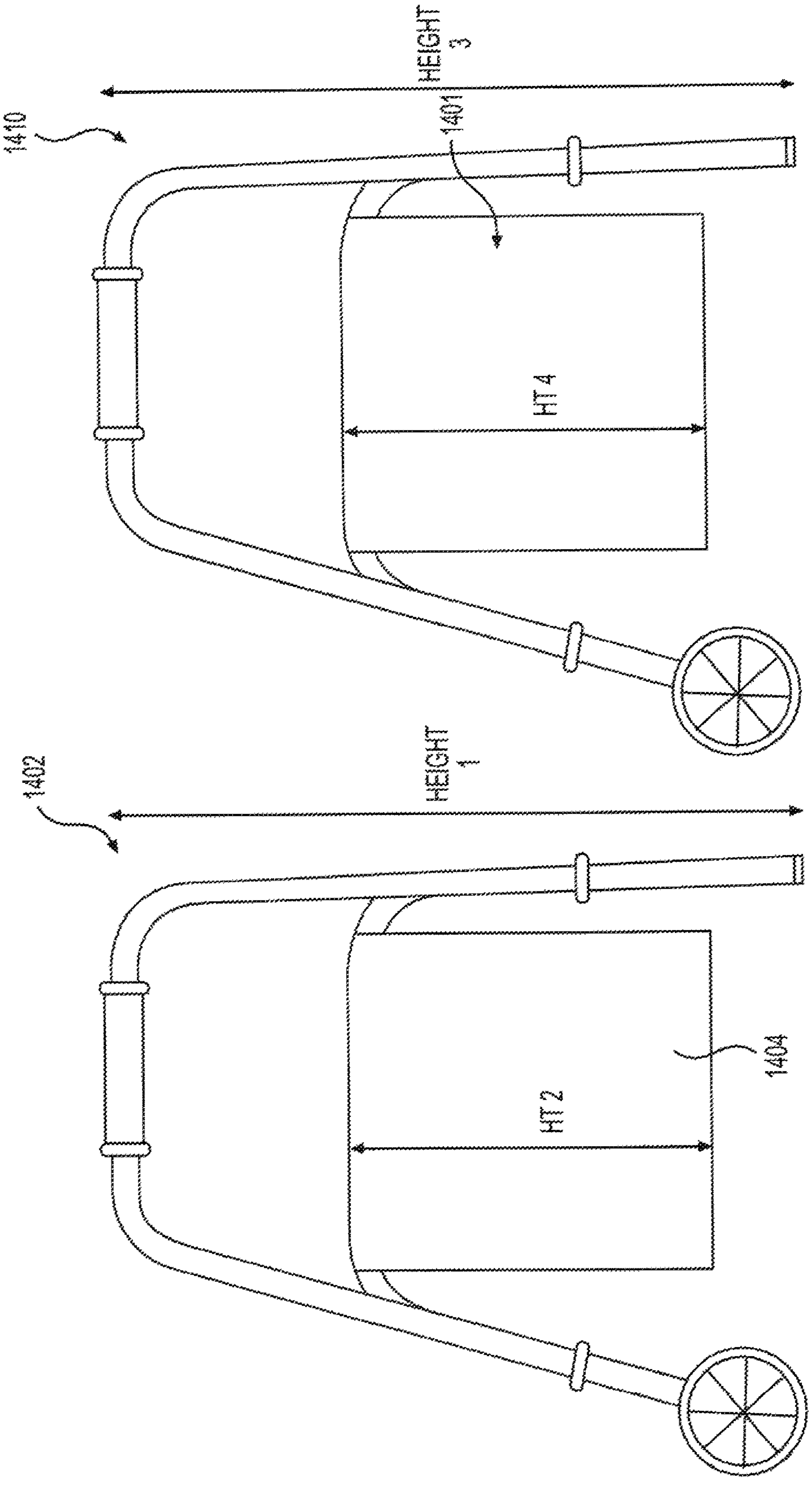
FIG. 14 is an example diagram of a guiding walker.

FIG. 14 shows an example schematic diagram of using a guider on different walkers. In embodiments, guider 1404 may be similar to guider 800 as described in FIG. 8. In a non-limiting example, as shown in FIG. 14, walker 1402 has guider 1404. As shown in FIG. 14, walker 1402 has a height 1 and guider 1404 has a height 2. In this non-limiting example, walker 1402 is used at an assisted living facility which also has walker 1410.

In this non-limiting example, walker 1410 has a different overall height of height 3. A nurse at the assisted living facility decides to detach guider 1404 from walker 1402 and install guider 1404 onto walker 1410. Since walker 1410 has a different height, the nurse adjusts the height of guider 1404 so that it can be fitted onto walker 1410. Thus, the height of guider 1404 is height 4. In embodiments, the adjustment is made by using a mechanism similar to that described in FIGS. 9A and 9B. Thus, as shown in FIG. 14, guider 1404 is now being used on walker 1410 and is used to make sure an individual using walker 1410 has their feet being properly guided while using walker 1410.

Figure 15:
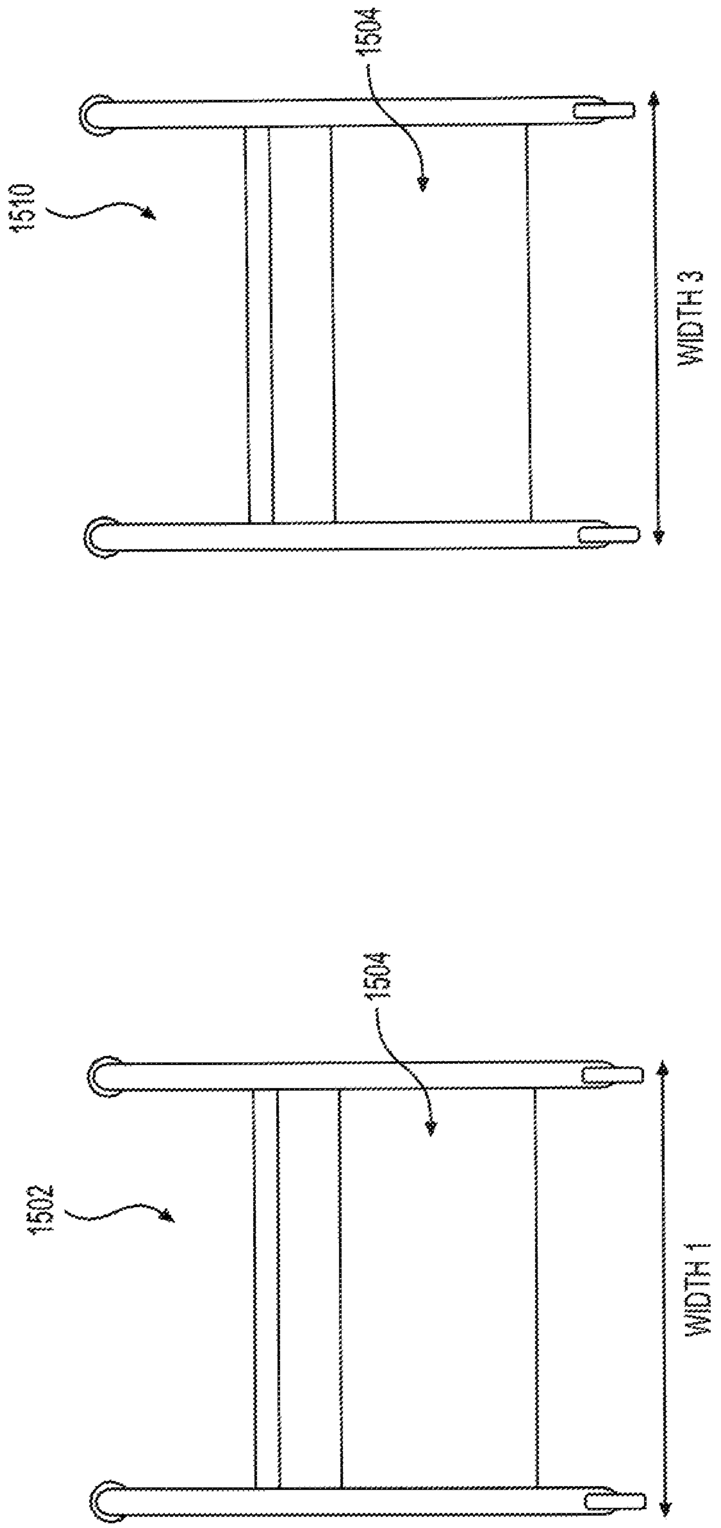
FIG. 15 is an example diagram of a guiding walker.

FIG. 15 shows an example schematic diagram of using a guider on different walkers. In embodiments, guider 1504 may be similar to guider 800 as described in FIG. 8. In a non-limiting example, as shown in FIG. 15, walker 1502 is shown and has guider 1504. As shown in FIG. 15, walker 1502 has a width 1 and guider 1504 has a width 2. In this non-limiting example, walker 1502 is used at an assisted living facility which also has walker 1510.

In this non-limiting example, walker 1510 has a different overall width of width 3. A nurse at the assisted living facility decides to detach guider 1504 from walker 1502 and install guider 1504 onto walker 1510. Since walker 1510 has a different width, the nurse adjusts the width of guider 1504 so that it can be fitted onto walker 1510. In embodiments, the adjustment is made by using a mechanism similar to that described in FIGS. 10A and 10B. Thus, as shown in FIG. 15, guider 1504, having a width 4, is now being used on walker 1510 and is used to make sure an individual using walker 1510 has their feet being properly guided while using walker 1510.

As described in the above figures, any of the example guiders may be attached to a walker such that they are 0.5 inches or less from the ground so as to allow the walker (attached to any of the above guiders) to move without an example guider from scraping the ground.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. An apparatus, comprising:

a walker; and a guider attached to the walker, wherein, the guider has three sides, wherein:

the three sides include a first side, a second side, and a third side, wherein:

the first side is attached to the second side and the first side attached to the third side, and the first side:

faces the front of the walker without any portion of the first side touching the walker, does not attach to any intermediate device that attaches to two front legs of the walker, and does not attach to any other intermediate device that attaches to a front bar of the walker, the second side is attached to a first side bar of the walker, wherein the second side has a curved top section that wraps around the first side bar of the walker;

the third side is attached to a second side bar of the walker, wherein the third side has another curved top section that wraps around the second side bar of the walker, wherein the first side includes a first layer and a second layer, wherein the first layer has a first slot that extends in a horizontal length that is perpendicular to the two front legs, and the second layer has a second slot that also extends in a horizontal length that is perpendicular to the two front legs, and wherein the first layer is attached to the second layer via one or more screws that connect the first layer and the second layer via the first and the second slots and that enable the first layer or the second layer to move in a horizontal direction;

wherein the second side includes a third layer and a fourth layer;

wherein the third side includes a fifth layer and a sixth layer;

wherein the fifth layer has a fifth slot that extends in a vertical length that is perpendicular to the second side bar, and the sixth layer has a sixth slot that also extends in a vertical length that is perpendicular to the second side bar, and wherein the fifth layer is attached to the sixth layer via one or more other screws passing through the fifth slot and the sixth slot that connect the fifth layer to the sixth layer.

2. The apparatus of claim 1, wherein the bottom of the guider is 0.5 inches above a bottom surface of each of the two front legs.

3. The apparatus of claim 1, wherein the first side is configured to have an adjustable width.

4. The apparatus of claim 1, wherein the second side is configured to have an adjustable height.

5. The apparatus of claim 1, wherein:

the first side of the guider is located below the front bar of the walker, the first side of the guider does not attach to the front bar, and the first side of the guider is located behind the front bar of the walker.

6. The apparatus of claim 1, wherein the guider is constructed of a non-fabric material.

7. The apparatus of claim 1, wherein:

a bottom portion of the second side does not touch any portion of the walker's two front legs, and no intermediary connector attaches to the bottom portion of the second side.

8. The apparatus of claim 1, wherein the guider is configured to be removed and attached to another walker with different dimensions.

9. The apparatus of claim 1, wherein a first front edge of the first layer is connected to the third layer.

10. The apparatus of claim 1, wherein there are no other slots within the first layer except for the first slot.

11. The apparatus of claim 1, wherein there are no other slots within the second layer except for the second slot.

12. The apparatus of claim 1, wherein a combination of the first side location being behind the front legs, without touching the front legs, and the first side located 0.5 inches from the ground is configured to prevent a user of the walker from losing their center of gravity.

13. The apparatus of claim 1, wherein the guider is enabled to prevent a person using the walker from having the person's feet extend outside the perimeter of the walker and to guide the person's feet in a first direction of the walker when the walker is pushed in the first direction.

14. A method, comprising:

pushing a walker system in a first direction, wherein the walker system includes a walker and a guider, wherein the guider has a first side, a second side, and a third side, wherein:

the first side of the guider:

faces the front of the walker without any portion of the first side touching the walker, does not attach to any intermediate device that attaches to two front legs of the walker does not attach to any other intermediate device that attaches to a front bar of the walker, and is located behind the two front legs of the walker, the second side of the guider is attached to a first side bar of the walker, wherein the second side has a curved top section that wraps around the first side bar of the walker;

the third side of the guider is attached to a second side bar of the walker, wherein the third side has another curved top section that wraps around the second side bar of the walker, wherein the first side includes a first layer and a second layer, wherein the first layer has a first slot that extends in a horizontal length, and the second layer has a second slot that also extends in a horizontal length, and wherein the first layer is attached to the second layer via one or more screws passing through the first slot and the second slot that enable the first layer or the second layer to move in a horizontal direction;

wherein the second side includes a third layer and a fourth layer, wherein the third layer has a third slot that extends in a vertical length that is perpendicular to the first side bar, and wherein the third layer is attached to the fourth layer via one or more additional screws passing through the third slot;

wherein the third side includes a fifth layer and a sixth layer;

wherein the fifth layer has a fifth slot that extends in a vertical length that is perpendicular to the second side bar, and the sixth layer has a slot that also extends in a vertical length that is perpendicular to the second side bar, and wherein the fifth layer is attached to the sixth layer via one or more other screws passing through the fifth slot and the sixth slot, and wherein, when the walker system is pushed in the first direction:

the first side prevents a person's feet, of the person using the walker, from moving in a direction that is different than the first direction, the second side keeps the person's feet to move within a perimeter of the walker, and the third side keeps the person's feet to stay within the perimeter of the walker; and pushing the walker system in a second direction, wherein, when the walker system is pushed in the second direction:

the first side prevents a person's feet, of the person using the walker system, from moving in a direction that is different than the second direction.

15. The method of claim 14, wherein:

the first side of the guider is located below the front bar of the walker, the first side of the guider does not attach to the front bar, and the first side of the guider is located behind the front bar of the walker.

16. The method of claim 14, wherein a bottom portion of the second side does not touch any portion of the walker and another bottom portion of the third side does not touch any portion of the walker.

17. The method of claim 14, wherein a first front edge of the first layer is connected to the third layer.

18. The method of claim 14, wherein when the walker is pushed in the first direction, the first side prevents a person's feet, of the person using the walker, from touching the two front legs.

* * * * *